US012699740B2

(12) United States Patent (10) Patent No.: US 12,699,740 B2
Gadit et al. (45) Date of Patent: Aug. 4, 2026

(54) DETERMINING GENERATIVE SEARCH RESULTS DOCUMENT FOR QUERIES USING GENERATIVE ARTIFICIAL INTELLIGENCE MODELS AND ARBITRATION MODELS

(71) Applicant: Microsoft Technology Licensing, LLC, Redmond, WA (US)

(72) Inventors: Mohamed Salman Ismail Gadit, San Jose, CA (US); Samer Hassan Hassan, Saratoga, CA (US); Andrew Peter Oakley, Seattle, WA (US); Nathan James Chalmers, Seattle, WA (US); Ronak Ashwinkumar Shah, Redmond, WA (US); Doran Chakraborty, Sunnyville, CA (US); Aparna Rajaraman, Woodinville, WA (US); Lile Palma Hattori, Kirkland, WA (US); Rami Sayar, Redmond, WA (US); Vera Aster Brubaker, Kirkland, WA (US); Matthew Yoshimi Cedeno, Chula Vista, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/094,431

(22) Filed: Mar. 28, 2025

(65) Prior Publication Data

US 2026/0211953 A1 Jul. 23, 2026

Related U.S. Application Data

(60) Provisional application No. 63/747,872, filed on Jan. 21, 2025.

(51) Int. Cl.
*G06F 16/93* (2019.01)
*G06N 3/0475* (2023.01)

(52) U.S. Cl.
CPC ........... *G06F 16/93* (2019.01); *G06N 3/0475* (2023.01)

(58) Field of Classification Search
None
See application file for complete search history.

(56) References Cited

U.S. PATENT DOCUMENTS

2012/0054216 A1 * 3/2012 Haahr .................... G06F 16/285
707/765
2014/0330804 A1 * 11/2014 Bao ...................... G06F 16/3338
707/706

(Continued)

OTHER PUBLICATIONS

International Search Report and Written Opinion received for PCT Application No. PCT/US2025/054719, Feb. 24, 2026, 14 pages.

(Continued)

*Primary Examiner* — Eddy Cheung
(74) *Attorney, Agent, or Firm* — Ray Quinney & Nebeker P.C.; Christopher K. Hallstrom

(57) ABSTRACT

A generative document system creates generative search results documents using generative artificial intelligence (AI) models and dynamically determines which one of the generative search results documents to provide in response to a search query. For example, in response to receiving a search query, the generative document system obtains search link results (e.g., website links and corresponding grounding information) for the search query and utilizes this information with multiple generative AI models to generate various types of generative search results documents. Additionally, the generative document system generates and utilizes a generative document arbitration model to determine, based on the search link results, which of the generative search results documents to provide in response to the search query.

20 Claims, 11 Drawing Sheets

(56) References Cited

U.S. PATENT DOCUMENTS

| | | | |
|---|---|---|---|
| 2021/0263982 A1* | 8/2021 | Zhong | G06N 3/08 |
| 2025/0077778 A1* | 3/2025 | Zhang | G06F 16/38 |
| 2025/0086211 A1* | 3/2025 | Bolcer | G06F 16/3344 |
| 2025/0124255 A1* | 4/2025 | Bergner | G06N 3/0475 |
| 2025/0190459 A1* | 6/2025 | Conway | G06N 3/0475 |
| 2025/0200100 A1* | 6/2025 | Hintz | G06F 16/383 |

OTHER PUBLICATIONS

Si et al., "Getting MoRE out of Mixture of Language Model Reasoning Experts", Findings of the Association for Computational Linguistics: EMNLP 2023, Dec. 2023, pp. 8234-8249.
"Introducing Bing Generative Search", Retrieved from https://blogs.bing.com/search/July-2024/generativesearch, Jul. 24, 2024, 04 Pages.
"The Next Step in Bing Generative Search", Retrieved from https://blogs.bing.com/search/October-2024/The-next-step-in-Bing-generative-search, Oct. 1, 2024, 05 Pages.

* cited by examiner

100

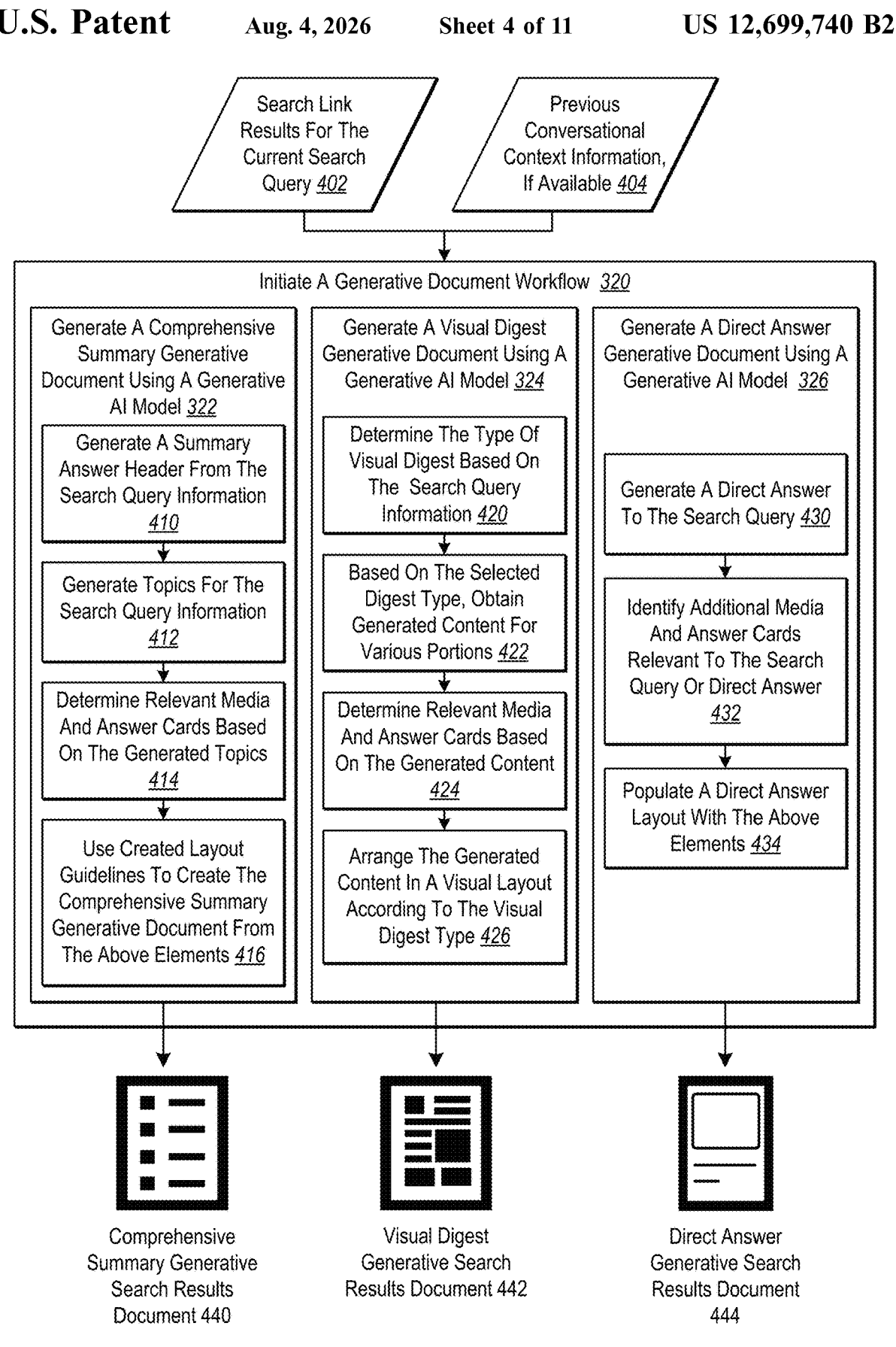

Search Link Results For The Current Search Query *402*

Previous Conversational Context Information, If Available *404*

Initiate A Generative Document Workflow *320*

Generate A Comprehensive Summary Generative Document Using A Generative AI Model *322*

Generate A Summary Answer Header From The Search Query Information *410*

Generate Topics For The Search Query Information *412*

Determine Relevant Media And Answer Cards Based On The Generated Topics *414*

Use Created Layout Guidelines To Create The Comprehensive Summary Generative Document From The Above Elements *416*

Generate A Visual Digest Generative Document Using A Generative AI Model *324*

Determine The Type Of Visual Digest Based On The Search Query Information *420*

Based On The Selected Digest Type, Obtain Generated Content For Various Portions *422*

Determine Relevant Media And Answer Cards Based On The Generated Content *424*

Arrange The Generated Content In A Visual Layout According To The Visual Digest Type *426*

Generate A Direct Answer Generative Document Using A Generative AI Model *326*

Generate A Direct Answer To The Search Query *430*

Identify Additional Media And Answer Cards Relevant To The Search Query Or Direct Answer *432*

Populate A Direct Answer Layout With The Above Elements *434*

Comprehensive Summary Generative Search Results Document 440

Visual Digest Generative Search Results Document 442

Direct Answer Generative Search Results Document 444

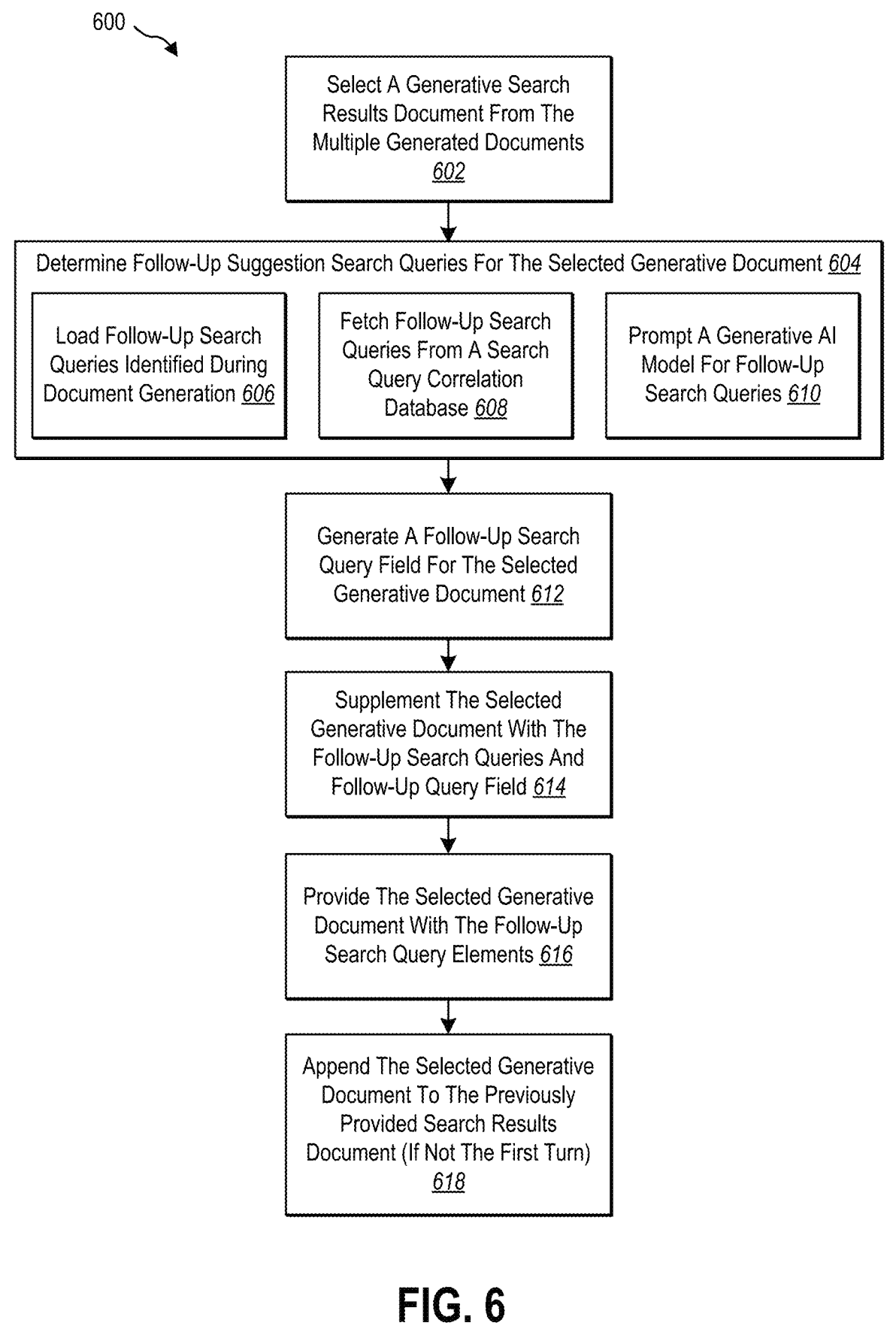

Select A Generative Search
Results Document From The
Multiple Generated Documents
*602*

Determine Follow-Up Suggestion Search Queries For The Selected Generative Document *604*

| Load Follow-Up Search Queries Identified During Document Generation *606* | Fetch Follow-Up Search Queries From A Search Query Correlation Database *608* | Prompt A Generative AI Model For Follow-Up Search Queries *610* |

Generate A Follow-Up Search
Query Field For The Selected
Generative Document *612*

Supplement The Selected
Generative Document With The
Follow-Up Search Queries And
Follow-Up Query Field *614*

Provide The Selected Generative
Document With The Follow-Up
Search Query Elements *616*

Append The Selected Generative
Document To The Previously
Provided Search Results
Document (If Not The First Turn)
*618*

FIG. 6

DETERMINING GENERATIVE SEARCH RESULTS DOCUMENT FOR QUERIES USING GENERATIVE ARTIFICIAL INTELLIGENCE MODELS AND ARBITRATION MODELS

CROSS-REFERENCE TO RELATED APPLICATIONS

This application claims benefit and priority to Provisional Application No. 63/747,872, filed on Jan. 21, 2025, the entirety of which is incorporated herein by reference.

BACKGROUND

In recent years, there have been significant advancements in both hardware and software domains, specifically in the field of internet search. Current internet search systems are designed to retrieve and present lists of links and resources in response to user search queries. Some of these systems also offer direct answers for frequently searched topics. However, as the number of accessible resources continues to grow, existing systems have limitations in providing useful and relevant answers without requiring significant user effort. Furthermore, despite recent advancements and improvements, existing systems face technical challenges in discovering results, crafting results in appropriate formats, and providing prompt query responses from these top search results due to various challenges, such as the ever-growing amount of available information. These and other issues are present in current search result systems.

BRIEF DESCRIPTION OF THE DRAWINGS

The following detailed description provides specific implementations accompanied by drawings. Additionally, each of the figures listed below corresponds to one or more implementations discussed in this disclosure.

FIG. 4 illustrates an example diagram for generating multiple generative search results document types for a search query.

FIG. 6 illustrates an example diagram facilitating multiple search turns for a search query and follow-up queries.

DETAILED DESCRIPTION

Figure 1:
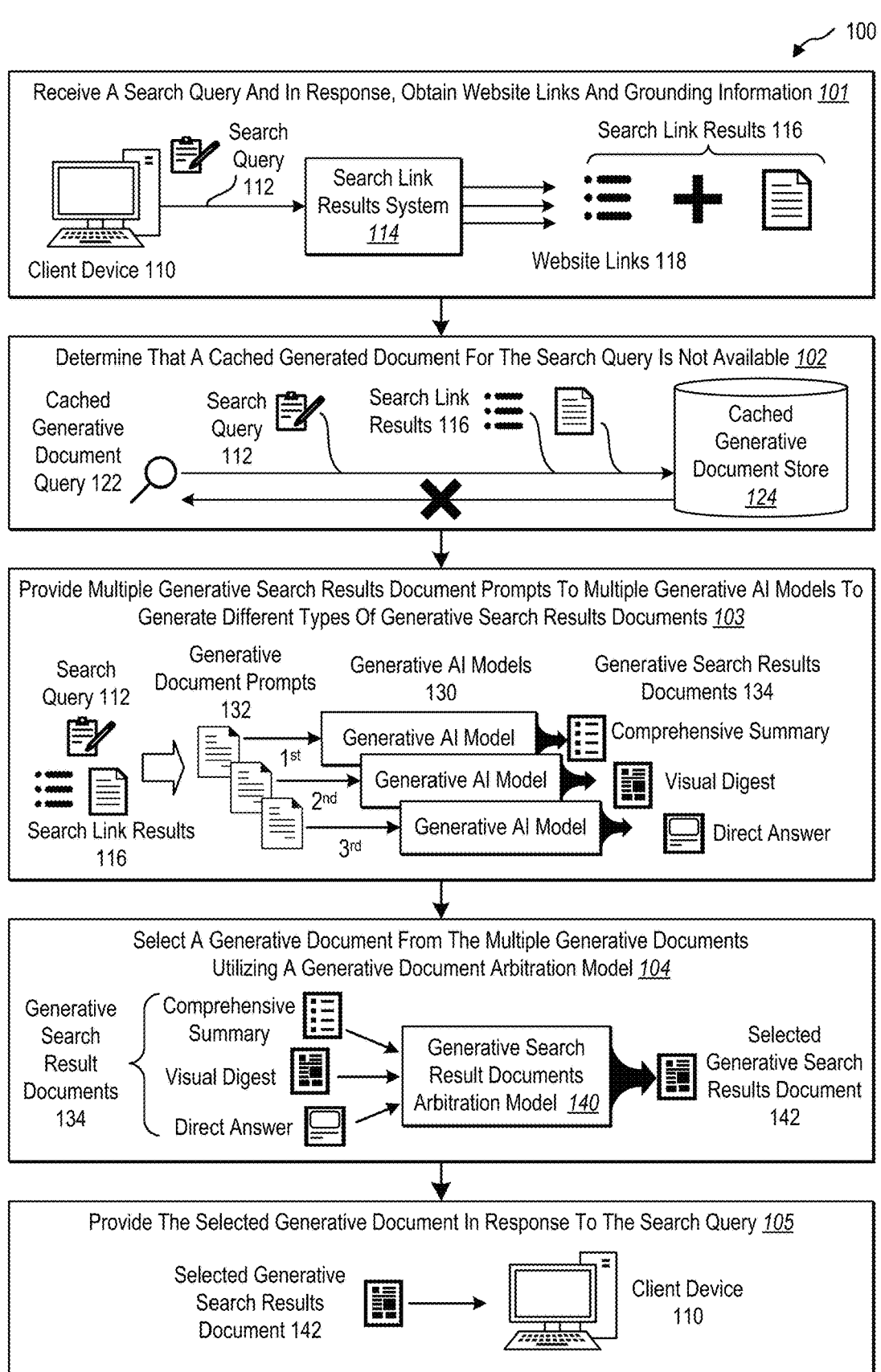
FIG. 1 illustrates an example overview of a generative document system using generative artificial intelligence (AI) models and a generative document arbitration model to create, select, and provide a generative search results document for a search query.

This disclosure describes utilizing a generative document system to create generative search results documents using generative artificial intelligence (AI) models and dynamically determining which one of the generative search results documents to provide in response to a search query. For example, in response to receiving a search query, the generative document system obtains search link results (e.g., website links and corresponding grounding information) for the search query and utilizes this information with multiple generative AI models to generate various types of generative search results documents. Additionally, the generative document system utilizes a generative document arbitration model to determine, based on the search link results, which of the generative search results documents to provide in response to the search query.

Implementations of the present disclosure provide benefits and solve problems in the art with systems, computer-readable media, and computer-implemented methods that utilize the generative document system to curate, build, and arbitrate generative search results documents from search queries using multiple generative AI models and arbitration models. As described below, the generative document system utilizes one or more search systems and generative AI models to leverage different outputs to build different types of generative search results documents, often concurrently, that include various generative portions. Additionally, the generative document system trains and utilizes a generative search results document arbitration model to determine which of the generative search results documents best align with the search query and/or follow-up search queries.

The following provides an example of how the generative document system generates and determines generative search results documents. In one or more implementations, a search query is received. In response, the generative document system obtains search link results (e.g., website links and corresponding grounding information) from a search system (e.g., a search results links system). The generative document system can also determine that a cached generated document for the search query and/or search link results is not available. Based on the cached generated document being unavailable (e.g., a matching generative document was never stored or has expired), the generative document system can generate multiple generative search results document prompts to provide to multiple generative AI models for the concurrent generation of multiple generative search results documents from the search query and the search link results. Additionally, the generative document system can select a generative search results document utilizing a generative search results document arbitration model and provide the selected generative search results document in response to the search query.

As described in this disclosure, the generative document system delivers several significant technical benefits in terms of improved accuracy, efficiency, and flexibility compared to existing search result systems. Moreover, the generative document system provides several practical applications that address problems related to providing search results in response to search queries.

To better understand the technical benefits of the generative document system, consider some existing search result systems. Some existing systems display responses in the form of a Search Engine Results Page (SERP) in response to a user's web search query. A SERP includes a list of results that are relevant to the search query. In their early stages, search result systems simply provided a series of hyperlinks correlated with the user's search terms in a SERP. More recent search result systems, in some situations, provide SERPs that also include responses to frequently queried subjects. Despite these advancements, current systems face technical challenges.

As mentioned earlier, the generative document system creates generative search results documents that provide streamlined, dynamic, and comprehensible answers to search queries. In various implementations, generative search results documents include accurate and efficient curation of enhanced search link results cited within the curated text. In some instances, the generative document system determines which type of generative document best answers the search query based on presentation quality scores generated by an arbitration model.

The generative document system improves the efficiency of computing systems by efficiently utilizing generative AI models to generate different curated versions of generative search results documents for a search query, then determining the most appropriate version to provide using an arbitration model. While some existing systems provide one or more generative answers, the poor presentation format causes multiple repeat searches of the same search query to arrive at an adequate answer, significantly wasting computing resources. In contrast, the generative document system utilizes an arbitration model to select the most accurate generative document to effectively answer the search query. This further results in fewer repeated search queries tying up computing device resources.

In some instances, the generative document system also achieves improved computational efficiencies by running parallel operations and utilizing gatekeeping thresholds. For example, by running operations in parallel, such as generating different types of generative search results documents, the generative document system increases the response time for providing the most accurate and relevant generative document in response to the search query. Furthermore, the generative document system utilizes a presentation quality threshold to prequalify generative search results documents for presentation selection.

In addition, the generative document system builds upon the outputs of multiple calls or prompts made to various specialized generative AI models. For example, the generative document system invokes multiple generative AI models with different prompts and/or prompt variations. Indeed, the generative document system efficiently leverages different features and functions of the generative AI models to create various outputs that can be compounded to improve accuracy at each stage in response to a search query.

In some implementations, the generative document system improves efficiency by reusing generative search results documents for recurring search result lists. For example, a generative search results document is created based on a set of search link results retrieved in response to a search query. When the same or a similar search query is repeated by the same or another user and results in the same or a similar set of search link results, the generative document system can efficiently and accurately reuse the same generative search results document without making additional calls to the generative AI models.

The generative document system also provides flexibility over existing systems. As mentioned earlier, the generative document system leverages different features of generative AI models to generate multiple output formats. Furthermore, the generative document system can use a chain of generative model outputs from earlier steps as inputs in later steps to skillfully create the elements needed to build the final formatted generative search results document.

As illustrated in the preceding discussion, this disclosure uses a variety of terms to describe the features and advantages of one or more described implementations. For instance, this disclosure describes the generative document system within the context of a cloud computing system. As an example, the term "cloud computing system" refers to a network of interconnected computing devices that provide various services and applications to computing devices (e.g., server devices and client devices) inside or outside of the cloud computing system. An example of a cloud computing system is described below in connection with FIG. 2.

As an example, a "generative artificial intelligence (AI) model" is an artificial intelligence system that utilizes deep learning and a large number of parameters (e.g., in the billions or trillions), which are trained and/or fine-tuned on one or more extensive datasets to produce coherent, contextually relevant, and fluently topic-specific outputs (e.g., text and/or images). In many instances, a generative model refers to an advanced computational system that uses natural language processing, machine learning, and/or image processing to generate coherent and contextually relevant human-like responses.

Generative AI models (both large and small) have applications in natural language understanding, content generation, text summarization, dialogue systems, language translation, creative writing assistance, image generation, audio generation, and more. A single generative AI model often performs a wide range of tasks by receiving different inputs, such as prompts (e.g., input instructions, rules, example inputs, example outputs, and/or tasks), data, and/or access to data. In response, the generative AI model generates various output formats, ranging from comprehensive generative summaries, generative visual digests of several types, to direct answer generative documents.

Moreover, generative AI models are primarily based on transformer architectures for understanding, generating, and manipulating human language. Generative AI models can also utilize other types of architectures, such as recurrent neural networks (RNNs), long short-term memory (LSTM) models, convolutional neural networks (CNNs), or other architectures. Examples of generative AI models include generative pre-trained transformer (GPT) models like GPT-3.5, GPT-4, and GPT-4o, bidirectional encoder representations from transformers (BERT) models, text-to-text transfer transformer models like T5, conditional transformer language (CTRL) models, and Turing-NLG. Other types of generative AI models include sequence-to-sequence models (Seq2Seq), vanilla RNNs, and LSTM networks. In some instances, a generative AI model includes a large generative AI model (LGM), a small generative AI model (SGM), a large language model (LLM), a small language model (SLM), and a small action model (SAM), which serve as text-based versions of generative AI models that receive text prompts and/or generate text outputs. In various implementations, a generative AI model is a multimodal generative model that receives multiple input formats (e.g., text, images, video, and data structures) and/or generates multiple output formats.

As another example, a "small generative AI model" refers to a smaller version or specialized version of an artificial intelligence system that utilizes significantly fewer parameters than large generative AI models. For example, a small generative AI model uses 1.5 billion parameters (as opposed to the 7 billion parameters of a large generative AI model). Additionally, in contrast to large models that perform tasks generally, a small generative AI model is fine-tuned to perform specific or specialized tasks. For instance, different small generative AI models are fine-tuned to perform varying operations to create a generative document, as described below. In some instances, a small generative AI model performs a broad range of applications but lacks the stored memory or internal data recall abilities of large generative AI models.

As an example, the terms "prompt," "model prompt," or "generative AI model prompt" refer to a request made to a generative AI model to create a generative AI model output based on plain language guidance. In some instances, the generative document system provides additional information along with a prompt. A prompt can include important contextual information and/or general framing information to ensure that the generative AI model understands the correct context, syntax, and grounding information of the data it is processing. Examples of prompts are provided below.

As an example, the term "search link results" refers to website links (e.g., hyperlinks) and their corresponding resources (e.g., grounding information) that are obtained in response to a search query (e.g., a user-requested search query). Often, one or more generative AI models are used to determine search link results from a large pool of search link results. In various implementations, providing enhanced search link results to a generative AI model enables the model to access resources, summaries, and/or metadata associated with the links. Search link results can include any number of outcomes corresponding to a search query.

As an example, the term "generative search results document" ("generative document," for short) refers to a search-based document that includes curated text narrative responses corresponding to a search query and its corresponding set of search link results. Generative search results documents can be created in various forms, including comprehensive generative summaries, generative visual digests of several types, and direct answer generative documents. Furthermore, each of the form types may include different versions.

In many implementations, generative search results documents include topic sections that correspond to a search query and a set of search link results based on the search query. For example, topic sections include responses that answer portions of a search query and/or alternative search queries. In some instances, a topic section is curated, meaning it is generated by a generative AI model to provide one or more sentences that include streamlined information about the topic, supported by citations linked to the search link results.

As another example, the term "answer card" refers to an element that provides direct answers to a search query or sub-queries derived from the search query. Answer cards provide quick, accurate answers to questions without requiring further search or interaction by a user. Answer cards can include text, images, audio, video, and/or animations to convey a quick answer. In addition, answer cards may include various versions that include different granularities of information and/or have different layout dimensions (e.g., available dimensions). Furthermore, answer cards include metadata and/or other grounding information to allow a generative AI model to understand the context associated with the card.

Implementation examples and details of the generative document system are discussed in connection with the accompanying figures, which are described next. For example, FIG. 1 illustrates an overview of a generative document system using generative artificial intelligence (AI) models and a generative document arbitration model to create, select, and provide a generative search results document for a search query according to some implementations. While FIG. 1 provides a high-level overview of the invention, additional details are provided in subsequent figures.

FIG. 1 illustrates a series of acts 100 performed by or following directions from the generative document system. As shown, the series of acts 100 briefly illustrates an example of how the generative document system uses generative AI models to create different types of generative search results documents and determine which of these generative documents, if any, to provide in response to the search query.

As shown, the series of acts 100 includes act 101 of receiving a search query and, in response, obtaining website links and grounding information. For example, a client device 110 provides a search query 112 to a search system that includes the generative document system. In response, a search link results system 114 within the search system utilizes a search web index to obtain search link results 116, which include website links 118 and corresponding grounding information 120. The search link results can include additional contextual information about the identified website links.

Using the search link results 116, the generative document system can provide a generative search results document in response to the search query. To begin, the generative document system can determine whether a cached generative document for the search query is available in a data store of cached generative documents. For example, the generative document system provides the search query 112 and/or the search link results 116 in a cached generative document query 122 to the cached generative document store 124, and, if available, a cached generative document is returned. Otherwise, a "cache miss" response is provided, indicating no available cached generative document, which results in generative documents needing to be generated using one or more generative AI models. Accordingly, act 102 includes determining that a cached generative document for the search query is not available and advancing to act 103.

Act 103 includes providing multiple generative search results document prompts to multiple generative AI models to generate different types of generative search results documents. For example, the generative document system generates generative document prompts 132 based on the search query 112 and the search link results system 114. In various implementations, the generative document prompts 132 are directed toward generating different types of generative documents for the search query 112. The generative document system may concurrently provide each of the generative document prompts 132 to a generative AI model from the generative AI models 130 to generate the different types of generative search results documents 134. Additional details about generating the different types of generative search results documents 134 are provided in connection with FIG. 4.

While multiple generative search results documents (e.g., multiple types or versions) are generated to a search query, the generative document system does not provide all of the versions in response to the search query. To illustrate, act 104 includes selecting a generative document from the multiple generative documents utilizing a generative document arbitration model. In various implementations, the generative document system provides the generative search results documents 134 to a generative search results document arbitration model 140, which determines a selected generative search results document 142 that is best-suited to answer the search query.

In some implementations, the generative search results document arbitration model 140 is a lightweight machine learning model that generates scores for each of the generative search results documents 134 based on their presentation quality given the search query, which the generative document system uses to select a generative search results document. In some implementations, the generative search results document arbitration model 140 is a generative AI model, such as a small generative AI model. In some implementations, the generative search results document arbitration model 140 is a rule-based model that utilizes heuristics to score or determine a selected generative search results document 142. Additional details about generating and utilizing a generative search results document arbitration model 140 are provided in connection with FIGS. 5A-5B.

Act 105 includes providing the selected generative document in response to the search query. For example, upon determining the selected generative search results document 142 from among the generative search results documents 134, the generative document system can provide the selected generative search results document 142 to the client device 110 in response to the search query 112.

Figure 2:
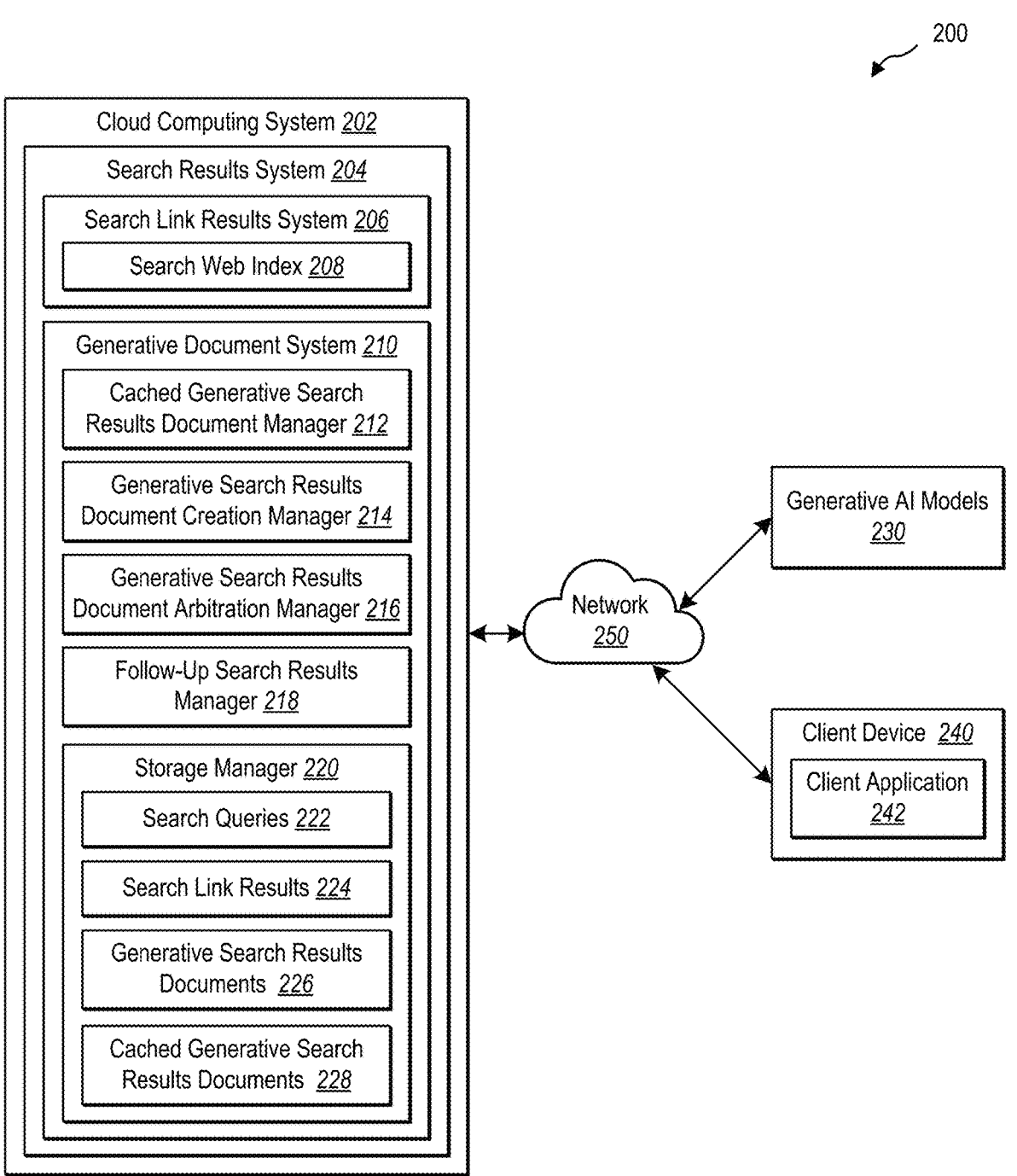
FIG. 2 illustrates an example computing environment where the generative document system is implemented.

With a general overview in place, additional details are provided regarding the components, features, and elements of the generative document system. To illustrate, FIG. 2 shows an example computing environment where the generative document system is implemented according to some implementations. In particular, FIG. 2 illustrates an example of a computing environment 200 with various computing devices, including a cloud computing system 202 associated with a generative document system 210. While FIG. 2 shows example arrangements and configurations of the computing environment 200, the cloud computing system 202, the generative document system 210, and associated components, other arrangements and configurations are possible.

As shown, the computing environment 200 includes a cloud computing system 202 associated with the generative document system 210, generative AI models 230, and a client device 240 with a client application 242, connected via a network 250. Many of these components may be implemented on one or more computing devices, such as one or more server devices, while some of these components may be implemented on personal devices. Further details regarding computing devices are provided below in connection with FIG. 9, along with additional details regarding networks, such as the network 250 shown.

Before describing the components of the cloud computing system 202, including the generative document system 210, other components of the computing environment 200 are discussed first to provide better context for the generative document system 210. As shown, the computing environment 200 includes the generative AI models 230, which correspond to one or more generative models tuned to efficiently perform various operations. The generative AI models 230 can include small generative AI models (SGMs) and/or large generative models (LGMs). For instance, a small generative AI model is fine-tuned to perform particular tasks, such as portions of creating generative documents or performing generative document arbitration. In some instances, a large generative AI model performs a broader range of tasks. In some implementations, one of the small or large generative AI models is a text-based generative AI model or a large text-only generative model that inputs and outputs text data (e.g., no images or audio), which runs more efficiently and returns results more quickly than multimodal-based models.

As shown, the computing environment 200 includes the client device 240. In various implementations, the client device 240 is associated with a user (e.g., a user client device) who requests a search query. In various instances, the client device 240 includes a client application 242, such as a web browser, mobile application, or another form of computer application for accessing and/or interacting with the cloud computing system 202 and/or the generative document system 210. For example, the client device 240 interacts with generative content (e.g., text narrative responses and corresponding answer cards) within a formatted generative search results document via the client application 242.

Returning to the cloud computing system 202, as shown, the cloud computing system 202 includes a search results system 204 (with a search link results system 206) and the generative document system 210. In various implementations, the search results system 204 provides search results in response to a search query. For example, the client device 240 submits a search request, and the search results system 204 returns search link results provided by the search link results system 206 using the search web index 208. The search results system 204 uses the generative document system 210 to create a generative search results document from the search link results.

As shown, the search link results system 206 includes a search web index 208. In various implementations, the search web index 208 returns a set of search link results (and/or other search grounding information) in response to a search request. In various implementations, a set of search results includes one or more ranked search link results. In some implementations, the search web index 208 returns linked content and answers along with search link results in response to a search query.

Regarding the generative document system 210, as shown, the generative document system 210 includes various components and elements implemented in hardware and/or software. For example, the generative document system 210 includes a cached generative search results document manager 212, a generative search results document manager 214, a generative search results document arbitration manager 216, a follow-up search results manager 218, and a storage manager 220. The storage manager 220 includes search queries 222, search link results 224, generative search results documents 226, and cached generative search results documents 228.

As mentioned, the generative document system 210 includes the cached generative search results document manager 212, which facilitates storing and retrieving cached generative search results documents 228 associated with previously received search queries and previously generated generative search results documents. In many implementations, the cached generative search results document manager 212 provides cached generative search results documents 228 for search queries 222 when available, which efficiently allows the document generation actions to be omitted.

The generative document system 210 includes the generative search results document manager 214, which builds generative search results documents 226 of various types (e.g., comprehensive summary generative search results documents, visual digest generative search results documents, and direct answer generative search results documents). In various implementations, the generative document system 210 utilizes one or more versions or instances of the generative AI models 230 to create the generative search results documents 226 for the search queries 222, based on the search link results 224 corresponding to the search queries 222.

The generative search results documents 226 can provide a streamlined, organized, and curated response to the search query, especially when generated and presented in a tailored layout or style that is correlated with the search query. Additionally, in some implementations, the generative search results document manager 214 provides generative search results documents 226 to the search results system 204 to be displayed (e.g., as part of a search engine results page (SERP) shown on the client device 240) and/or provided to downstream applications.

The generative document system 210 also includes the generative search results document arbitration manager 216, which manages arbitration selection when multiple different types or versions of the generative search results documents 226 exist for a search query. In various implementations, the generative search results document arbitration manager 216 analyzes, scores, ranks, classifies, and/or categorizes generative search results documents 226, enabling a generative search results document to be selected from various types of generative search results documents generated for a search query. As described herein, the generative search results document arbitration manager 216 can be a lightweight machine learning model or a neural network, a generative AI model, or a heuristic-based model.

The generative document system 210 includes a follow-up search results manager 218. In various implementations, the follow-up search results manager 218 enables follow-up search queries to be provided and processed for a search query. For example, the provided search results can expand with appended generative search results documents as follow-up search queries are requested.

In some implementations, the generative document system 210 is located on a separate computing device from the search results system 204 within the cloud computing system 202 (or apart from the cloud computing system 202). In various implementations, the search results system 204 operates without, or independently of, the generative document system 210.

Figure 3:
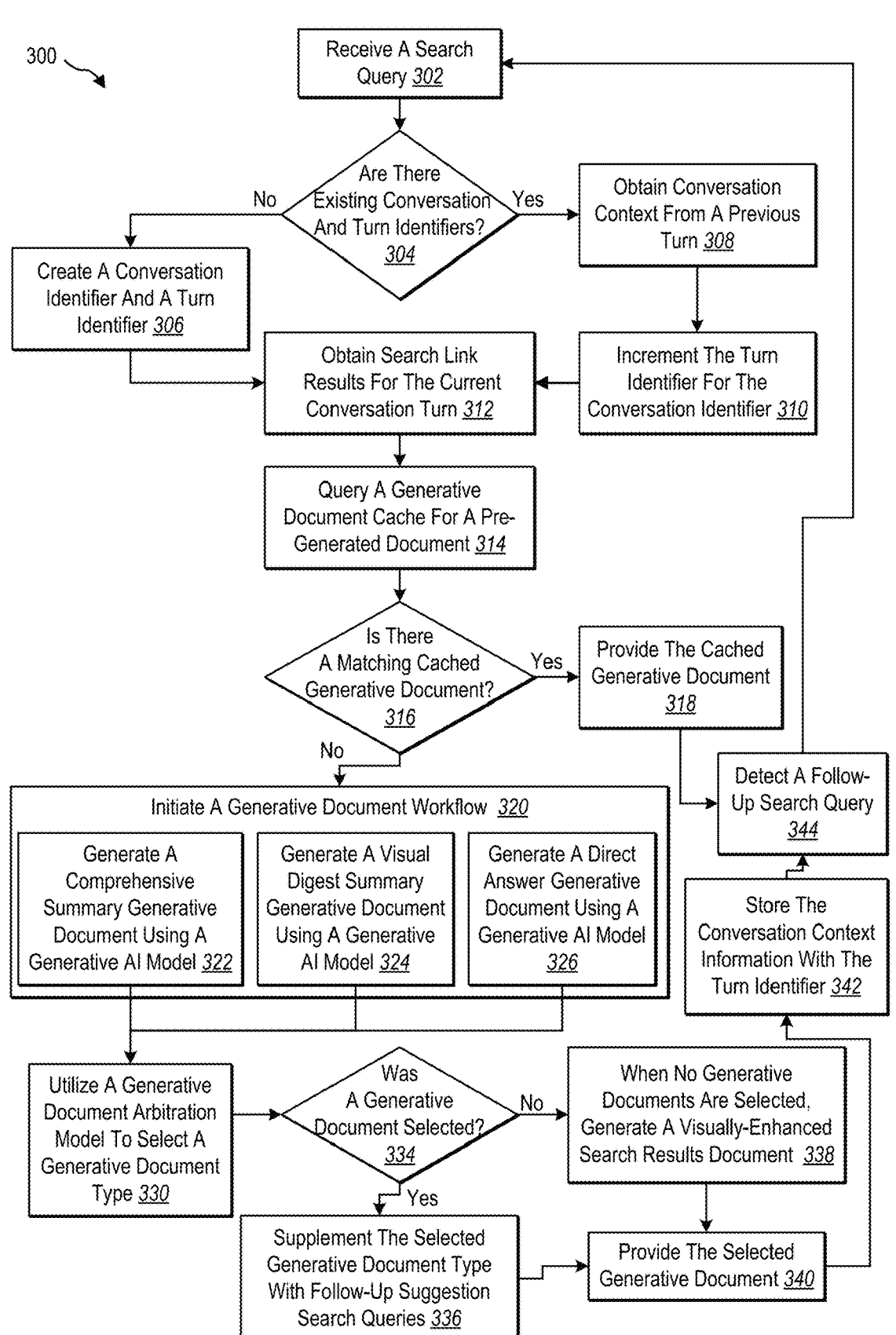
FIG. 3 illustrates an example overview state diagram of the generative document system in creating generative search results documents and using a generative document arbitration model to select a generative search results document to provide in response to a search query.

Turning to the next figure, FIG. 3 provides a state diagram overview of generating, selecting, and providing generative documents in response to a search query. In particular, FIG. 3 illustrates an example overview state diagram of the generative document system in creating generative search results documents and using a generative document arbitration model to select a generative search results document to provide in response to a search query according to some implementations. As shown, FIG. 3 includes a series of acts 300 performed by or in connection with the generative document system 210.

To begin, the series of acts 300 includes act 302 of receiving a search query. As mentioned above, a search results system receives a search query from a user associated with a client device. In response, the search results system can use the generative document system 210 to generate and return a generative search results document that is customized and/or correlates to the search query.

The generative document system 210 can determine whether the search query is associated with a previous conversation and search turn. To illustrate, act 304 includes determining whether there are existing conversation identifiers and turn identifiers. If not, the generative document system 210 creates a conversation identifier and a turn identifier, as shown in act 306. In some implementations, the generative document system 210 associates the search query and/or a user identifier with the conversation identifier. For instance, the conversation identifier uniquely identifies the search query thread with the user identifier, and the turn identifier identifies the number of previous queries that have been made and responded to within the search query conversation.

If there is an existing conversation identifier, the generative document system 210 obtains conversation context from a previous turn, as shown in act 308. For example, the generative document system 210 uses the turn identifier to determine the number of previous conversation contexts that are stored. Additionally, the generative document system 210 can retrieve one or more previous conversation contexts from previous search queries in the conversations. Elements of conversation contexts are described below.

Additionally, when the search query corresponds to a previous conversation, the generative document system 210 increments the turn identifier for the conversation identifier, as shown in act 310. In this way, the generative document system 210 can track and store conversation context for the current search query.

Act 312 includes obtaining search link results for the current conversation turn. For example, the generative document system 210 utilizes the search results system to obtain search link results (e.g., website links and grounding information) that correspond to the search query. In some implementations, the search results system 204 and/or the generative document system 210 obtain additional search query context, such as one or more search intents. If subsequent search turns exist, the generative document system 210 can use previous search queries and/or conversation contexts to generate the search link results.

Act 314 includes querying a generative document cache for a pre-generated document. In various implementations, the generative document system 210 provides a cached generative document query that includes the search query and, in some cases, one or more previous search queries or conversation contexts from the search query conversation. The generative document system 210 uses the provided information to search for stored or cached generative documents that match the search query and/or meet (e.g., satisfy) the search query correlation threshold.

In some instances, the generative document system 210 uses a lightweight embedding machine learning model or neural network to determine similarities between the search query and/or cached generative documents. In alternative implementations, the generative document system 210 uses another type of model. In some implementations, the generative document cache also compares one or more of the website links (e.g., the top 10 links) or compares a hash of the website links to determine whether a current search query matches and is also relevant to a cached generative document.

Act 316 includes determining whether there is a matching cached generative document. If a cached generative document exists or is available, then the generative document system 210 provides the cached generative document in response to the search query, as shown in act 318. For example, the generative document system 210 and/or the search results system provides the cached generative document to the requesting client device.

If no matching or relevant cached generative document is available, the generative document system 210 initiates a generative document workflow, shown as act 320. As briefly shown, act 320 includes various sub-acts corresponding to creating generative documents of different types or formats for the search query using one or more generative AI models. While three examples are shown, the generative document system 210 can generate additional and/or different types of generative documents. Examples of some generative search result document types are provided in FIGS. 7A-7C.

As shown, act 320 includes a first sub-act 322 of generating a comprehensive summary generative document (or a "comprehensive generative document," for short) using a generative AI model. For example, a comprehensive generative document includes a directed answer and various curated topics and/or subtopic sections laid out in a dynamic user interface for presenting the directed answer and the generative sections in an organized, streamlined, and natural manner.

The second sub-act 324 includes generating a visual digest generative document using a generative AI model. In various implementations, a visual digest generative document includes a visual layout of answer sections and fact-based elements that provide intelligent responses to the search query. As described below in connection with the next figure, the generative document system 210 can use generative AI models to generate various types of visual digest generative documents based on the context and content of the search query.

The third sub-act 326 includes generating a directed answer generative document using a generative AI model. For example, a directed answer document includes a directed answer to the search query. In some instances, the directed answer generative document includes additional topics related to the search query.

In various implementations, the generative document system 210 generates the different generative document types for the search query concurrently. For example, the generative document system 210 uses different generative AI models and/or different instances of the same generative AI model instances mentioned above to generate the directed answer generative document. By using generative AI models concurrently, the generative document system 210 can minimize the delay in providing a generative document response to the search query.

Act 330 includes utilizing a generative document arbitration model to select a generative document type. For example, the generative document system 210 creates a generative document arbitration model (an "arbitration model," for short) to determine which of the multiple generative documents to select based on the search query. In various implementations, the generative document arbitration model is a lightweight machine learning model or neural network that scores each generative document based on its ability to respond to the search query. In some implementations, the generative documents are evaluated based on presentation quality. The arbitration model may score, rank, or classify the generative documents based on additional and/or different features. Additional details regarding arbitration models are provided in connection with FIGS. 5A and 5B.

Based on the output or outcome of the arbitration model, the generative document system 210 selects one of the generative documents from the set of multiple generative documents created for the search query. Indeed, in many instances, the generative document system 210 selects the generative document best suited to answer the search query, along with providing appropriate supporting content and/or visualizations that bolster the answer in a meaningful, yet streamlined manner.

In some implementations, none of the generative documents are selected because they all fail to meet a presentation quality threshold. This concept is described further below. Accordingly, act 334 includes determining whether a generative document was selected.

If a generative document was selected, act 336 includes supplementing the selected generative document with follow-up suggestion search queries. For example, the generative document system 210 identifies one or more follow-up search queries to add to the selected generative document as suggestions for follow-up topics. The generative document system 210 can also include a follow-up search query field in the selected generative document for a user to ask follow-up questions regarding the current or previous turns of the search query conversation. Additional details regarding follow-up search queries are provided below in connection with FIG. 6.

As mentioned above, in some instances, the generative document system 210 verifies that each of the multiple generative documents meets a presentation quality threshold. In many cases, a presentation quality threshold represents both the visual quality as well as the functional quality (e.g., usefulness) of a generative document. Indeed, a generative document that is aesthetically appealing, but not useful will have a low presentation quality threshold. In addition, when a generative document does not meet or satisfy the presentation quality threshold, it is not selectable as the selected generative document.

In some cases, all of the multiple generative documents fail to meet the presentation quality threshold. For instance, the content of the search is unsafe or inappropriate according to community guidelines. Similarly, if the generative document system 210 begins processing a seemingly safe search query, but the content is deemed unsafe, the generative document system 210 stops creating some or all of the generative documents corresponding to the search query. In these cases, the generative document system 210 implements a fallback search results document.

To illustrate, act 338 includes generating a visually-enhanced search results document (a "visually-enhanced document," for short) if no generative document is selected. In various implementations, the visually-enhanced document is a non-generative document that includes some or all of the search link results. In some instances, the visually-enhanced documents are generated from a generative AI model.

In some implementations, the visually-enhanced document analyzes the content of the search link results to extract relevant portions, identify additional media (e.g., images, videos, animations, and/or text), and curate a response from the website links that are visually enhanced enriched, and in some instances, includes augmented content. Indeed, the visually-enhanced document can provide a visually improved version of the traditional website links when other generative documents fail to satisfy a minimum level of presentation quality.

Act 340 includes providing the selected generative document (or visually-enhanced document). For example, the generative document system 210 provides the generative document to the requesting client device in response to the search query. For instance, the generative document system 210 provides the generative document within a webpage returned to the requesting client device in answer to the search query.

Act 342 includes storing the conversation context information with the turn information. For example, once a generative document is selected, the generative document system 210 stores some or all of the search query, the search link results, and the selected generative document (or a representation of the generative document). In various implementations, the generative document system 210 stores this conversation context information with the conversation identifier and/or the turn identifier. In some instances, the conversation context information is stored in the generative document cache. In some implementations, act 342 occurs concurrently with act 340.

Act 344 includes detecting a follow-up search query. For example, with the selected generative document, including the supplemented follow-up search queries provided to the requesting client device, the generative document system 210 receives an indication that a follow-up search query has been selected. In response, the generative document system 210 can repeat some or all of the series of acts 300 to generate and select a generative document to provide in response to the follow-up search query. In various implementations, the generative document system 210 appends the follow-up generative document to the previously provided generative document.

As mentioned above, FIG. 4 corresponds to generating different types of generative documents for a search query. For instance, FIG. 4 includes an example diagram for generating multiple generative search results document types for a search query according to some implementations. In particular, FIG. 4 expands upon act 320 above of initiating a generative document workflow, which includes generating the multiple generative search results document types.

As with FIG. 3, the generative document workflow in FIG. 4 shows three examples of approaches for generating three different types of generative documents for a search query. These three examples in the workflow in FIG. 4 expand upon sub-acts 322-326, which are introduced above. Additionally, FIG. 4 includes the generative document system 210 utilizing search link results for the current search query 402 and previous conversational context information 404, if available, within the generative document workflow.

As described above, the first sub-act 322 of act 320 includes generating a comprehensive summary generative document using a generative AI model. As mentioned earlier, a comprehensive generative document can include a directed answer and various curated topics and/or subtopic sections laid out in a dynamic user interface for presenting the directed answer and the generative sections in an organized, streamlined, and natural manner.

As shown, the first sub-act 322 can include additional sub-acts. For instance, generating a comprehensive generative document includes sub-act 410 of generating a summary answer header from the search query information using one or more prompts provided to generative AI models (e.g., SGMs). In some instances, the summary answer header includes a directed answer to the search query generated by a generative AI model that has been provided with the current search query 402 and/or the previous conversational context information 404.

Sub-act 412 can include generating topics from the search query information. In various implementations, the generative document system 210 generates various generative prompts to identify topics and curates each topic section using one or more generative AI models (e.g., SGMs). For example, the generative document system 210 provides a section generation prompt to determine topic sections and sub-topic sections using one or more generative AI models. In various implementations, the generative document system 210 provides a topic curation prompt for each of the discovered topics and/or subtopics to one or more generative AI models.

Sub-act 414 includes determining relevant media and answer cards based on the generated topics. For instance, the generative document system 210 determines matching media and/or answer cards that correlate with each generated topic or sub-topic. In various implementations, the generative document system 210 employs an answer card system and/or a lightweight answer card neural network that receives answer card requests and returns lists of candidate answer cards corresponding to a search query, topic, or portion of a search query.

Sub-act 416 includes using created layout guidelines to create or generate the comprehensive summary generative document from the above elements. In some implementations, the generative document system 210 utilizes a generative AI model to determine layout guidelines based on curated topics and matched media and/or answer cards. Then, in these instances, using the generated layout guidelines, the generative document system 210 creates a comprehensive generative summary search results document 440 that includes the summary answer and curated topic sections (and sub-sections) with media and/or answer cards presented intuitively and dynamically. An example of a comprehensive generative summary search results document 440 is provided in FIG. 7A.

The second sub-act 324, as mentioned above, includes generating a visual digest generative document using a generative AI model. As mentioned above, a visual digest generative document can include a visual layout of answer sections and fact-based elements that provide intelligent responses to the search query. For instance, a visual digest generative document can take on the look and feel of a magazine spread, including various related features, elements, images, graphics, and text.

The second sub-act 324 can include further sub-acts, as shown in FIG. 4. Sub-act 420 includes determining the type of visual digest based on the search query information. For example, the generative document system 210 can generate a variety of visual digest generative documents depending on the type and context of the presented search query. Example types of visual digest generative documents include entities, navigation, biographies, weather, images, movies, stocks, events, activities, health, sports, and music, among other examples. Indeed, the generative document system 210 can analyze the search query, previous search queries, and/or conversation context information to determine the type of visual digest generative document to provide, where the type can include content depth, layout style, and/or media emphasis.

Sub-act 422 includes obtaining generated content for various portions that correspond to the selected digest type. In various implementations, the generative document system 210 customizes one or more generative prompts to obtain information according to the selected digest type. In one or more implementations, the generative document system 210 obtains some of the content needed for the various portions using data caches.

Sub-act 424 includes determining relevant media and answer cards based on the generated content. As described above, the generative document system 210 can obtain media (e.g., images, animations, or videos) and/or answer cards that correlate to the generated content of the various sections, portions, or features. Indeed, the generative document system 210 can curate each portion with generative content, media, and other elements.

Sub-act 426 includes arranging the generated content in a visual layout according to the visual digest type. For example, the generative document system 210 generates the visual digest generative document by arranging the various curated portions to fit the selected visual digest type.

As shown, the generative document system 210 performs the second sub-act 324 to generate a visual digest generative search results document 442. The generative document system 210 can generate the visual digest generative search results document 442 concurrently with generating the comprehensive generative summary search results document 440 and a direct answer generative search results document 444, which is described next.

The third sub-act 326, as mentioned above, includes generating a direct answer generative document using a generative AI model. As mentioned above, a direct answer generative document can include a direct answer to the search query. In some instances, the direct answer generative document can also include additional topics related to the search query.

The third sub-act 326 can include further sub-acts, as shown in FIG. 4. Sub-act 430 includes generating a direct answer to the search query. For example, the generative document system 210 provides a direct answer prompt to a generative AI model to succinctly answer the search query. In response, the generative document system 210 receives the direct answer to the search query.

Sub-act 432 includes identifying additional media and answer cards relevant to the search query or direct answer. As described above, the generative document system 210 can obtain media (e.g., images, animations, or videos) and/or answer cards that correlate to the search query or direct answer.

Sub-act 434 includes populating a direct answer layout with the above elements. For example, the generative document system 210 uses the generative content and/or additional obtained content to generate the direct answer generative search results document 444.

As mentioned above, the generative document system 210 can generate different generative document versions for the search query concurrently. Additionally, while the generative document system 210 can use one or more generative AI models, including separate instances of the same model, in some instances, the generative document system 210 utilizes different generative AI model types.

Figure 5A:
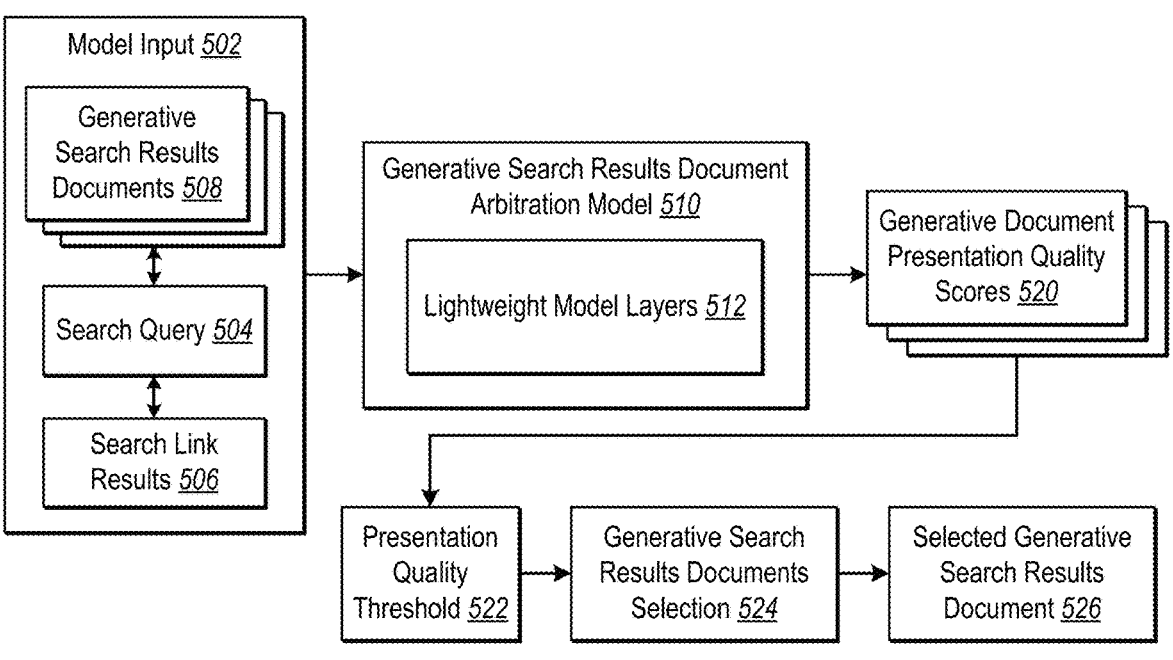
FIGS. 5A-5B illustrate examples of training and generating a generative document arbitration model to select a generative search results document from multiple generative search results documents of different types.
Figure 5B:
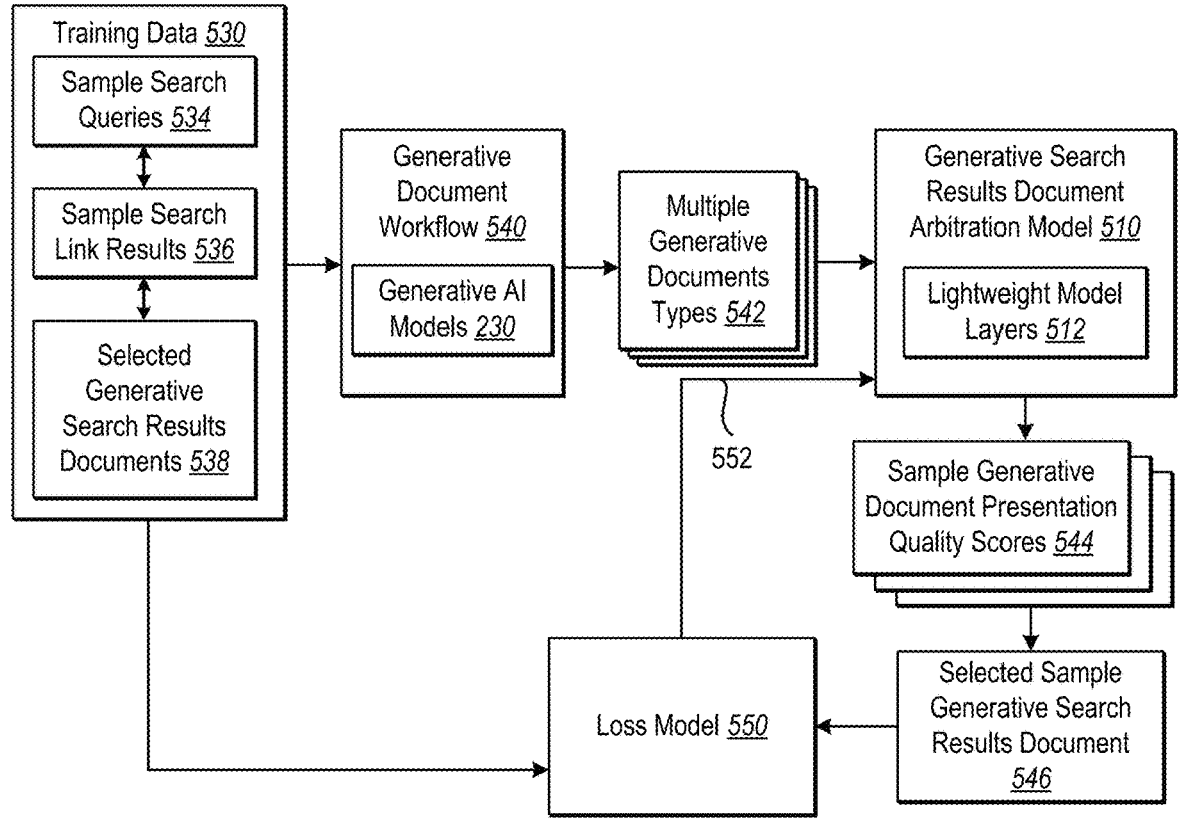

As mentioned above, FIGS. 5A-5B provide additional details regarding arbitration models. For instance, FIGS. 5A-5B illustrate examples of training and generating a generative document arbitration model to select a generative search results document from multiple generative search results documents of different types according to some implementations. In particular, FIG. 5A relates to implementing an arbitration model (i.e., a generative search results document arbitration model), while FIG. 5B relates to training the arbitration model.

As described above, the generative document system 210 provides different versions of generative documents for a search query, generated concurrently, to the arbitration model. The arbitration model then evaluates each generative document and provides a score, classification, rank, or another metric that the generative document system 210 uses to compare and select one of the generative documents to provide in response to the search query.

To illustrate, FIG. 5A includes model input 502, a generative search results document arbitration model 510, generative document presentation quality scores 520, a presentation quality threshold 522, a generative search document selection 524, and a selected generative search results document 526. As shown, the model input 502 includes a search query 504, search link results 506, and generative search results documents 508. As provided above, the generative document system 210 generates multiple versions of the generative search results documents 508, often concurrently, based on the search query 504 and the search link results 506. The generative document system 210 provides the model input 502 to the generative search results document arbitration model 510 for evaluation.

As shown, the generative search results document arbitration model 510 includes lightweight model layers 512, which can include a model classifier. While one example version of an arbitration model architecture is shown, the generative search results document arbitration model 510 can include various architectural types. Furthermore, in some instances, the generative search results document arbitration model 510 may be a generative AI model, such as an SGM or an LGM. In one or more implementations, the generative search results document arbitration model 510 operates as a heuristic model that uses a set of rules to evaluate and score the generative search results documents 508 based on their presentation quality.

In some implementations, the generative search results document arbitration model 510 determines feature vector embeddings for the search query 504 and/or the search link results 506. The generative search results document arbitration model 510 also generates feature vector embeddings for each of the generative search results documents 508. Subsequently, the model input 502 determines a generative document presentation quality score for each of the generative search results documents 508 based on their feature vector correlation with the search query 504 and/or the search link results 506.

In some implementations, the generative search results document arbitration model 510 determines the generative document presentation quality scores 520 based on presentation quality. For example, the generative search results document arbitration model 510 assesses how effectively each of the generative search results documents 508 presents and conveys a response to the search query, judged by the content, accuracy, and/or visual appeal of the generative document.

As mentioned above, in various implementations, the generative search results document arbitration model 510 utilizes a set of rules to score the generative search results documents 508. For example, the generative search results document arbitration model 510 applies a set of rules that award points to a generative document when rules are satisfied. In some instances, the generative search results document arbitration model 510 scores and/or ranks the generative search results documents 508 based on a hierarchical structure (e.g., prioritizing selection as Type A>Type B>Type C>Type D based on which types are available).

If the generative search results document arbitration model 510 is a generative AI model, the generative search results document arbitration model 510 may generate and provide an arbitration prompt to the generative AI model with instructions to score, evaluate, and/or rank the generative search results documents 508 and return generative document presentation quality scores.

Indeed, in the above case, the generative document system 210 utilizes an arbitration model that evaluates different types of generative documents. Furthermore, these generative document types can vary significantly, both visually and in terms of usefulness (e.g., the content they include). Nevertheless, the generative document system 210 can use the generative search results document arbitration model 510 to equitably arbitrate the generative search results documents 508 and fairly generate comparable generative document presentation quality scores.

As shown, the generative search results document arbitration model 510 generates the generative document presentation quality scores 520 for the generative search results documents 508. A generative document presentation quality score can indicate how well a generative document provides an effective response to the search query 504. In some cases, a generative document presentation quality score evaluates how visually appealing and presentable a generative document is as a response to a search query.

In some implementations, the generative document presentation quality scores are expressed as a score, such as 0-100. In various implementations, the generative document presentation quality scores are classified within a range of classes or categories (e.g., poor, fair, adequate, average, good, or excellent). The generative document presentation quality scores can include any type of comparable metric.

Upon generating the generative document presentation quality scores 520, the generative search results document arbitration model 510 can perform an initial performance score verification to ensure that a minimum presentation quality level is met. For example, the generative search results document arbitration model 510 compares the presentation quality score of each generative document to a minimum presentation quality threshold, dropping generative documents with scores that do not meet the minimum presentation quality threshold.

After filtering out generative documents with presentation scores that do not meet the presentation quality threshold, the generative document system 210 can select a generative search results document from the search query based on the generative document presentation quality scores 520. Often, the generative document system 210 selects the generative document with the highest presentation quality score. Accordingly, FIG. 5A ends with a selected generative search result document for the search query 504.

FIG. 5B relates to training the arbitration model according to some implementations. As shown, FIG. 5B includes training data 530, the generative search results document arbitration model 510, a generative document workflow 540 with the generative AI models 230, multiple generative document types 542, sample generative document presentation quality scores 544, and a loss model 550. The generative search results document arbitration model 510, upon training, may correspond to the generative search results document arbitration model 510 described above in connection with FIG. 5A.

As shown, the training data 530 includes sample search queries 534 and sample search link results 536 that correspond to the sample search queries 534. The training data 530 also includes selected generative search results documents 538 that correspond to the sample search queries 534. For example, each of the sample search queries 534 corresponds to one of the selected generative search results documents 538. The selected generative search results documents 538 include a variety of generative document types. Accordingly, each selected generative search results document serves as the ground truth in both content and generative document types for a sample search query.

In various implementations, the generative document system 210 trains the generative search results document arbitration model 510 by providing the multiple generative document types 542, which are generated using the generative document workflow 540 and the generative AI models 230 from the sample search queries 534 and the sample search link results 536. For example, using a similar process as described above, the generative document system 210 generates the multiple generative document types 542 for each of the sample search queries 534 using the generative document workflow 540. In various implementations, the generative document system 210 can also train and/or refine the arbitration model based on user feedback.

The generative search results document arbitration model 510 generates the sample generative document presentation quality scores 544 from the multiple generative document types 542. Additionally, the generative document system 210 chooses a selected sample generative search results document 546 based on the sample generative document presentation quality scores 544.

The generative document system 210 uses the loss model 550 to determine how well the generative search results document arbitration model 510 generates the sample generative document presentation quality scores 544 at each training iteration. For example, the generative document system 210 utilizes the loss model 550 to compare the selected sample generative search results document 546 to the selected generative search results documents 538 for corresponding sample search queries and provides feedback 552 to the arbitration model. Indeed, in various implementations, the generative document system 210 utilizes supervisory end-to-end learning and loss function optimization to fine-tune the generative search results document arbitration model 510 to generate accurate generative document presentation quality scores for multiple generative documents.

As mentioned above, FIG. 6 provides additional details regarding follow-up search queries. For instance, FIG. 6 illustrates an example diagram facilitating multiple search turns for a search query and follow-up queries according to some implementations. As shown, FIG. 6 includes a series of acts 600 performed by or in connection with the generative document system 210.

The series of acts 600 includes act 602 of selecting a generative search results document from the multiple generated documents, a process that is described above. For example, based on generative document presentation quality scores determined by an arbitration model, the generative document system 210 selects the generative document version with the highest generative document presentation quality score as the selected generative document.

Act 604 includes determining follow-up suggestion search queries for the selected generative document. In some instances, as shown in sub-act 606, the generative document system 210 loads follow-up search queries identified during document generation. For example, the generative document system 210 determines sub-topics and/or related information associated with the search query during the search result document generation process, which the generative document system 210 includes as follow-up search queries.

As shown in sub-act 608, the generative document system 210 can fetch follow-up search queries from a search query correlation database. For example, based on the search query, the generative document system 210 queries a search query database and identifies follow-up queries. Sub-act 610 includes the generative document system 210 prompting a generative AI model for follow-up search queries. For example, the generative document system 210 generates and provides a follow-up search query prompt to a generative AI model to generate follow-up search queries.

Act 612 includes generating a follow-up search query field for the selected generative document. For instance, the generative document system 210 creates a follow-up search query field for a user to input follow-up questions or queries in connection with the selected generative document.

Act 614 includes supplementing the selected generative document with follow-up search queries and a follow-up query field. For example, the generative document system 210 supplements the selected generative documents by adding the follow-up search queries to topics, sections, or features to which they correspond. In some implementations, the generative document system 210 adds the follow-up query field near the follow-up search queries. In some implementations, the generative document system 210 hovers over the follow-up query field at the bottom of the selected generative document and moves as the user scrolls down.

Act 616 includes providing the selected generative document with the follow-up search query elements. As mentioned above, the generative document system 210 can provide the selected generative document with the follow-up search query elements to a client device in response to the search query.

Act 618 includes appending the selected generative document to the previously provided search results document if it is not the first search turn. For example, when a user provides an initial search query, the selected generative document is provided. Each time a follow-up search query is received, the generative document system 210 can generate and append a follow-up generative document to build on the conversation.

As mentioned above, the generative document system 210 can repeat the generative search results document process for each follow-up search query. Accordingly, the generative document system 210 may append generative documents of different types in a conversation, depending on which types are best suited for the follow-up search queries.

As mentioned above, FIGS. 7A-7C provide examples of some generative search results document types. For instance, FIGS. 7A-7C illustrate example graphical user interfaces that show different types of generative documents in response to a search query.

Figure 7A:
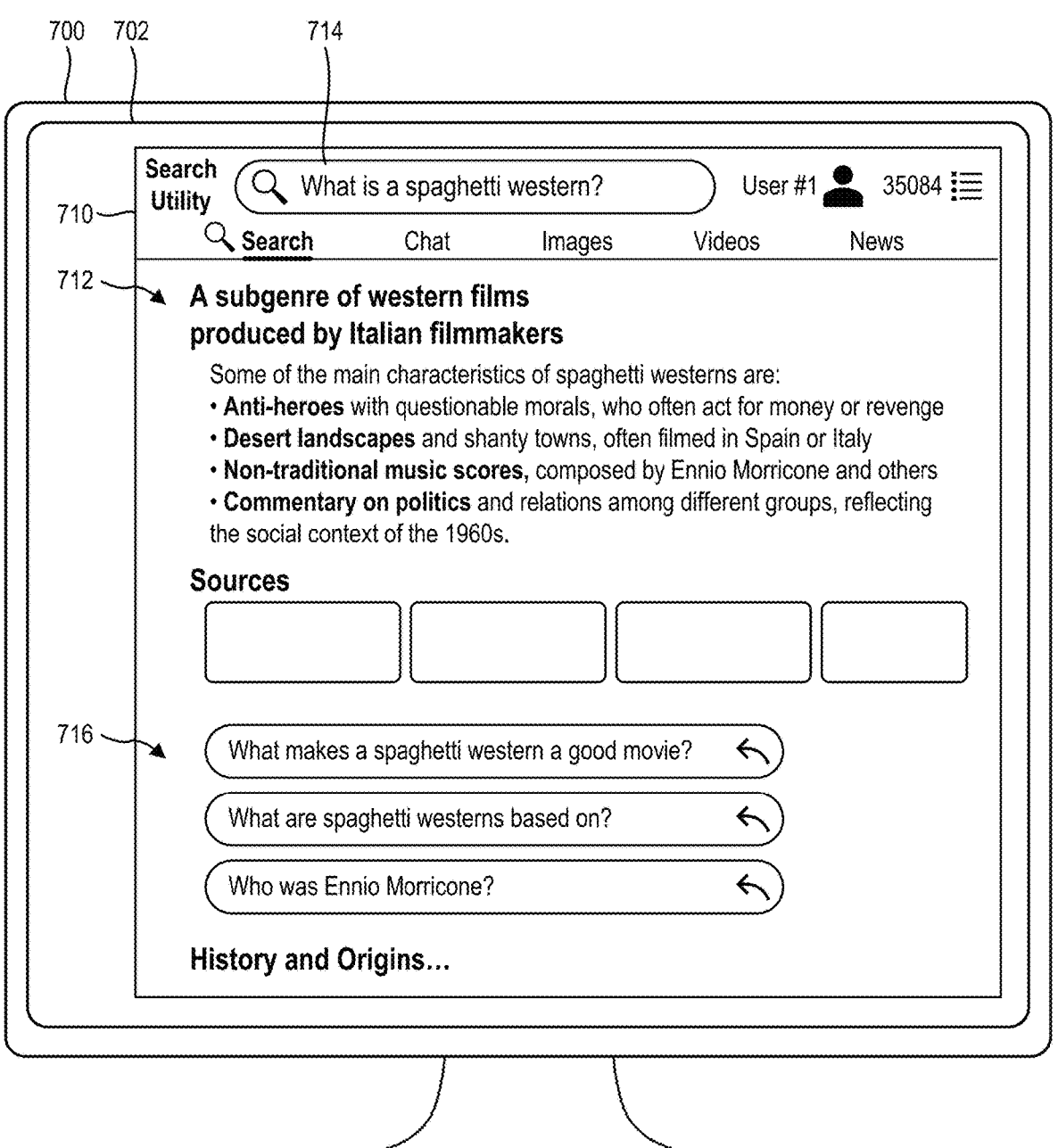
FIGS. 7A-7C illustrate example graphical user interfaces that show different types of generative documents in response to a search query.
Figure 7B:
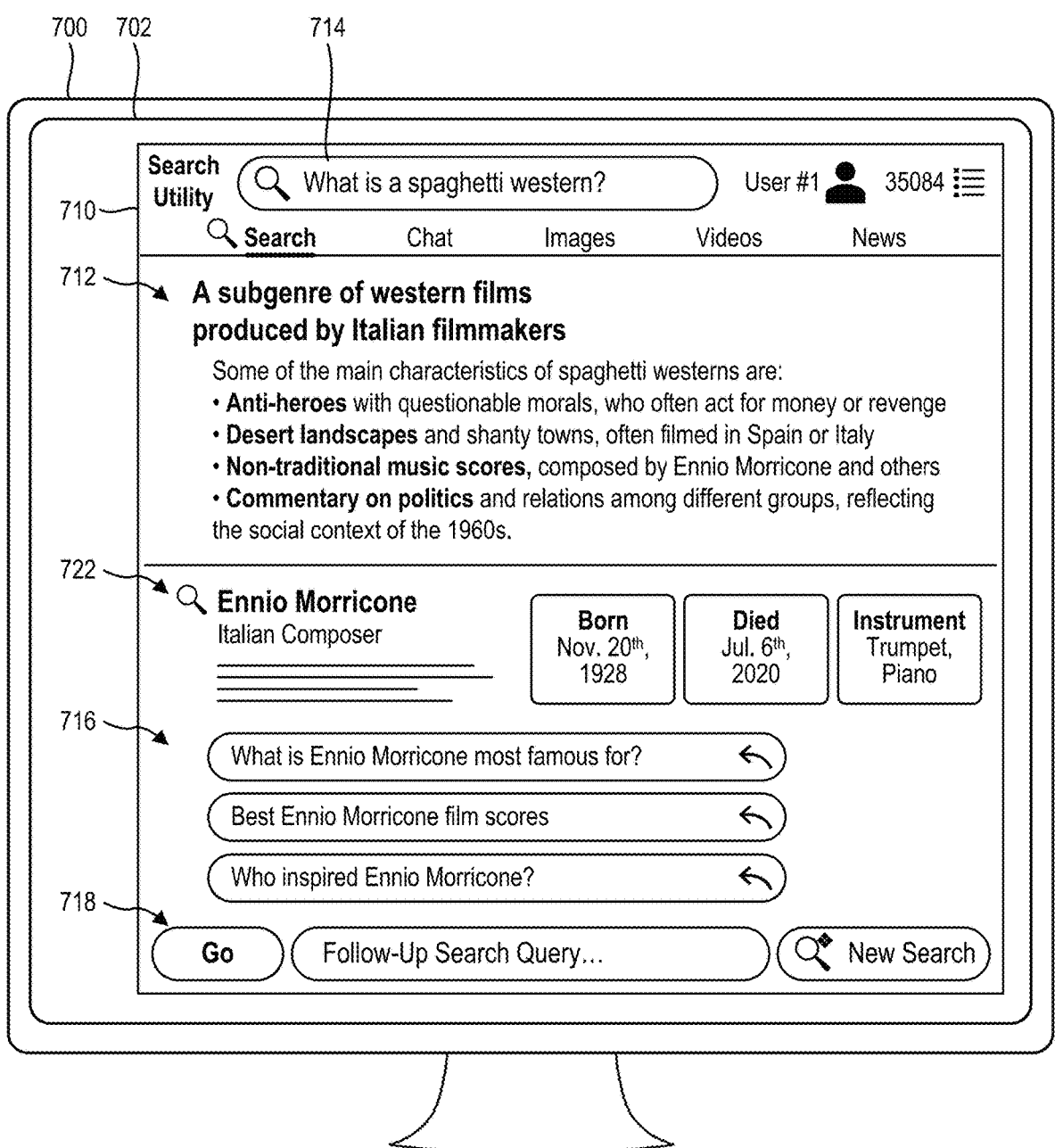
Figure 7C:
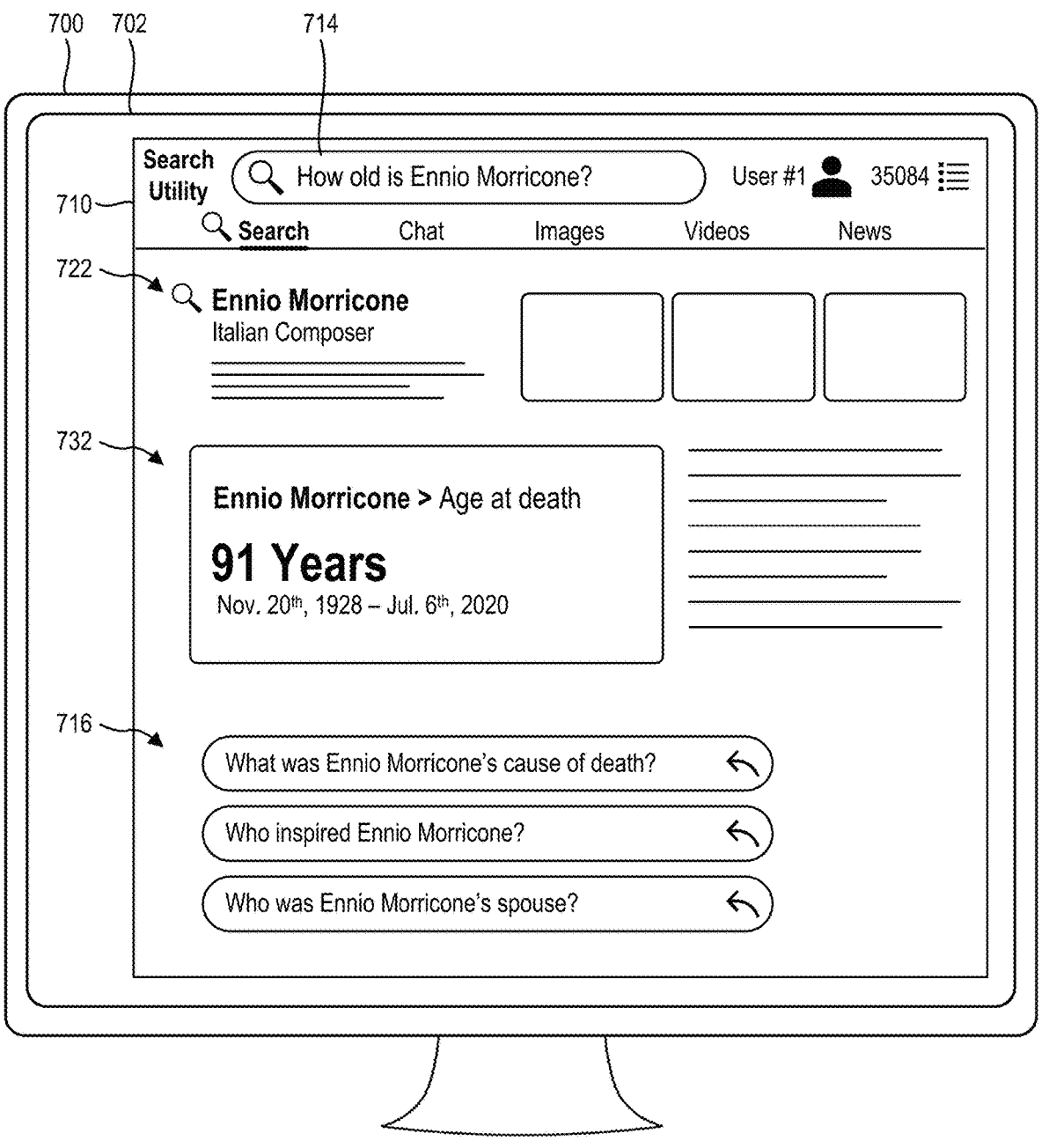

As shown, FIGS. 7A-7C include a client device 700 that includes a display of a graphical user interface 702. The graphical user interface 702 includes a client application 710, such as a web browser application. A user may use the search utility to provide search queries and follow-up search queries to the generative document system 210 and receive generative search results documents in response. Indeed, the client application 710 may allow a user to interact with the search query system and/or the generative document system to receive a generative search results document for a search query.

Turning to each figure, FIG. 7A corresponds to a comprehensive summary generative document 712. As shown, in response to a search query 714, the generative document system 210 generates multiple generative document versions and selects the summary generative document versions. The generative document system 210 then provides the comprehensive summary generative document 712 for display on the client device 700 via the client application 710. As shown, the comprehensive summary generative document 712 includes curated sections, media, and sources.

The comprehensive summary generative document 712 also includes follow-up search queries 716 at the end of a curated section. Upon selecting a follow-up search query, the generative document system 210 repeats the document generative process for the follow-up search queries, as described above.

FIG. 7B corresponds to a visual digest generative document. For example, upon detecting a follow-up search query for a person (e.g., "Ennio Morricone"), the generative document system 210 generates a new generative search results document, which is appended to the end of the comprehensive summary generative document 712. As shown, the visual digest generative document 722 has a distinctly different style and content layout compared to the comprehensive summary generative document 712.

As illustrated, the visual digest generative document 722 also includes follow-up search queries 716 corresponding to content within the visual digest generative document 722. The visual digest generative document 722 further includes a follow-up search query field 718 for the selected generative document, allowing a user to input follow-up questions or queries related to the selected generative document. For example, a user may provide input to the follow-up search query field 718 to further research a topic.

FIG. 7C corresponds to a direct answer generative document. For example, upon detecting a user inputting a follow-up search query into the follow-up search query field 718, the generative document system 210 again generates a new generative search results document. As shown, the direct answer generative document 732 is appended to the end of the visual digest generative document 722 within the conversation. Indeed, FIG. 7C shows the generative document system 210 creating and providing a direct answer generative document 732.

As noted above, each of the follow-up actions has caused the generative document system 210 to create generative documents of different types. However, in some instances, the generative document system 210 generates the same generative document type but with different content.

Figure 8:
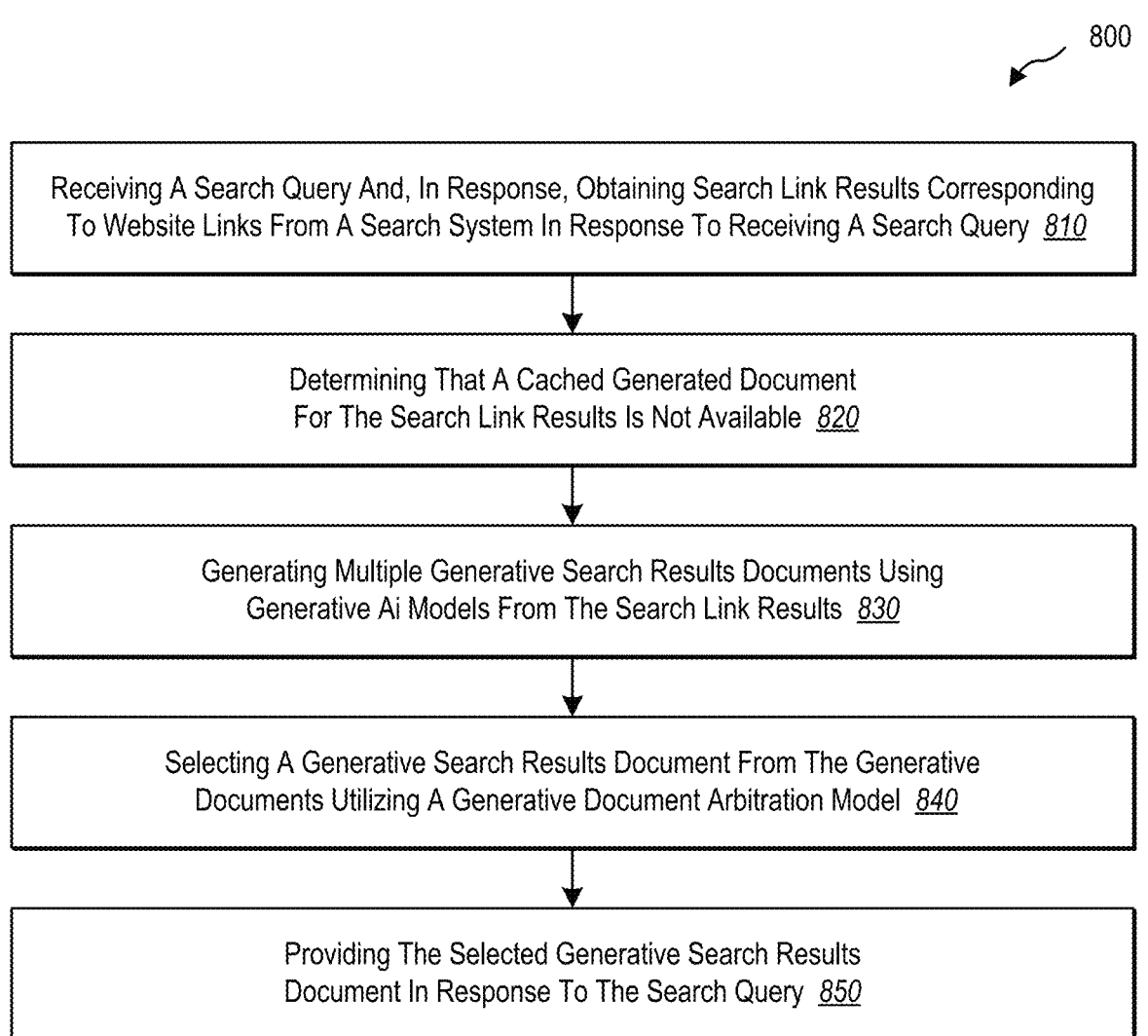
FIG. 8 illustrates an example series of acts of a computer-implemented method for generating one or more search results documents using one or more artificial intelligence models.

Turning now to FIG. 8, this figure illustrates an example series of acts of a computer-implemented method for generating one or more search results documents using one or more AI models according to some implementations. While FIG. 8 illustrates acts according to one or more implementations, alternative implementations may omit, add to, reorder, and/or modify any of the acts shown.

The acts in FIG. 8 can be performed as part of a method (e.g., a computer-implemented method). Alternatively, a computer-readable medium can include instructions that, when executed by a processing system with a processor, cause a computing device to perform the acts in FIG. 8. In some implementations, a system (e.g., a processing system comprising a processor) can perform the acts in FIG. 8. For example, the system includes a processing system and a computer memory including instructions that, when executed by the processing system, cause the system to perform various actions or steps.

As shown, the series of acts 800 includes act 810 of obtaining search link results corresponding to website links from a search system in response to receiving a search query. For instance, in example implementations, act 810 involves obtaining, in response to receiving a search query, search link results, including website links and grounding information corresponding to the website links, from a search system. In various implementations, act 810 includes receiving the search query from a client device, determining the search link results using a search index, and providing the selected generative search results document within a webpage to the client device in response to the search query.

As further shown, the series of acts 800 includes act 820 of determining that a cached generated document for the search link results is not available. For instance, in example implementations, act 820 involves determining that a cached generated document corresponding to the search query and the search link results is not available. In some implementations, act 820 includes determining that a cached generated document corresponding to the search query and the search link results is not available by querying a generative search results document store (e.g., database) with the search query and the search link results and receiving a negative response regarding an available matching cached generated document. In some implementations, cached generative search results documents include previously generative search results documents for search queries previously generated by a generative AI model to populate curated content formatted in a visually enhanced layout.

In some instances, act 820 includes determining that a cached generated document for an additional search query is available. For example, in some instances, act 820 includes querying a generative search results document store with the additional search query and additional search link results corresponding to the additional search query, determining a correlation score between the additional search query and the additional search link results with a set of stored generative search results documents, and selecting a cached generative search results document from the set of stored generative search results documents based on the cached generative search results document having the highest correlation score that also satisfies a correlation threshold.

In various implementations, act 820 includes obtaining additional search link results in response to receiving an additional search query, determining that an additional cached generated document corresponding to the additional search query and the additional search link results is available, and providing the additional cached generated document in response to the search query without generating multiple additional generated documents using the multiple generative AI models.

As further shown, the series of acts 800 includes act 830 of generating multiple generative search results documents using generative AI models from the search link results. For instance, in example implementations, act 830 involves generating multiple generative search results document prompts to provide to multiple generative AI models for generating multiple generative search results documents concurrently from the search query and the search link results based on the cached generated document being unavailable.

In some implementations, act 830 includes generating a first generative search results document prompt to provide to a first generative AI model for generating a comprehensive summary generative search results document from the search query and the search link results, generating a second generative search results document prompt to provide to a second generative AI model for generating a visual digest generative search results document from the search query and the search link results, and generating a third generative search results document prompt to provide to a third generative AI model for generating a direct answer generative search results document from the search query and the search link results. In various implementations, the first generative search results document prompt, the second generative search results document prompt, and the third generative search results document prompt are provided concurrently.

In various implementations, a first generative AI model of the multiple generative AI models generates a comprehensive summary generative search results document, a second generative AI model of the multiple generative AI models generates a visual digest generative search results document, and/or a third generative AI model of the multiple generative AI models generates a direct answer generative search results document. In some cases, the multiple generative search results documents differ from each other.

As shown further, the series of acts 800 includes act 840 of selecting a generative search results document from the generative documents utilizing a generative document arbitration model. For instance, in example implementations, act 840 involves selecting a selected generative search results document from the multiple generative search results documents utilizing a generative search results document arbitration model. In some implementations, the generative search results document arbitration model determines a presentation quality score for each of the multiple generative search results documents, and the presentation quality scores are used to select the selected generative search results document. In various implementations, act 840 includes storing the selected generative search results document in a generative search results document store with the search query and the search link results.

In one or more implementations, the generative search results document arbitration model includes a lightweight machine learning model generated to determine a presentation quality score for generative search results documents based on corresponding search queries. In some instances, selecting the selected generative search results document from the multiple generative search results documents can include generating a first presentation quality score for a comprehensive summary generative search results document using the generative search results document arbitration model based on the search query, generating a second presentation quality score for a visual digest generative search results document using the generative search results document arbitration model based on the search query, and/or selecting the comprehensive summary generative search results document as the selected generative search results document based on the first presentation quality score being more favorable than the second presentation quality score. In various implementations, act 840 includes removing a generative search results document of the multiple generative search results documents from selection consideration based on determining that the generative search results document has a presentation quality score that does not meet a presentation quality threshold.

In various implementations, the generative search results document arbitration model includes a generative AI model generated to determine a presentation quality score for generative search results documents based on corresponding search queries. In some instances, the generative search results document arbitration model includes a set of heuristics for selecting the selected generative search results document, and the set of heuristics includes a ranking of generative search results documents according to available generative search results documents.

In some implementations, act 840 includes obtaining additional search link results in response to receiving an additional search query; generating multiple additional generative search results document prompts to provide to the multiple generative AI models for generating multiple additional generative search results documents from the additional search query and the additional search link results; based on determining, by the generative search results document arbitration model, that the multiple additional generative search results documents do not meet a presentation quality threshold, generating a visually-based search results document from the search link results; and providing the visually-based search results document in response to the additional search query.

As shown further, the series of acts 800 includes act 850 of providing the selected generative search results document in response to the search query. For instance, in example implementations, act 850 involves providing the selected generative search results document in response to the search query.

In various implementations, the series of acts 800 can include various additional acts. For example, the series of acts 800 includes storing the search query and context information corresponding to the selected generative search results document. In some instances, the selected generative search results document includes a set of suggested follow-up search queries corresponding to content included in the selected generative search results document and a follow-up search query field for receiving a follow-up search query corresponding to the selected generative search results document.

In some implementations, the series of acts 800 includes storing the search query and context information corresponding to the selected generative search results document; receiving a follow-up search query from the selected generative search results document; generating multiple additional generative search results document prompts to provide to multiple generative AI models for generating multiple additional generative search results documents concurrently from the follow-up search query and additional search link results; selecting an additional selected generative search results document from the multiple additional generative search results documents utilizing the generative search results document arbitration model; and providing the additional selected generative search results document in response to the follow-up search query. In one or more implementations, the multiple additional generative search results document prompts also include the search query and the context information corresponding to the selected generative search results document from a previous search query request.

In some instances, the context information includes information corresponding to the search query, the search link results, the website links, the grounding information, and the content of the selected generative search results document. In some implementations, providing the additional selected generative search results document includes appending the additional selected generative search results document to the selected generative search results document from the previous search query request. In some instances, the additional selected generative search results document is a different generative search results document type from the selected generative search results document.

Figure 9:
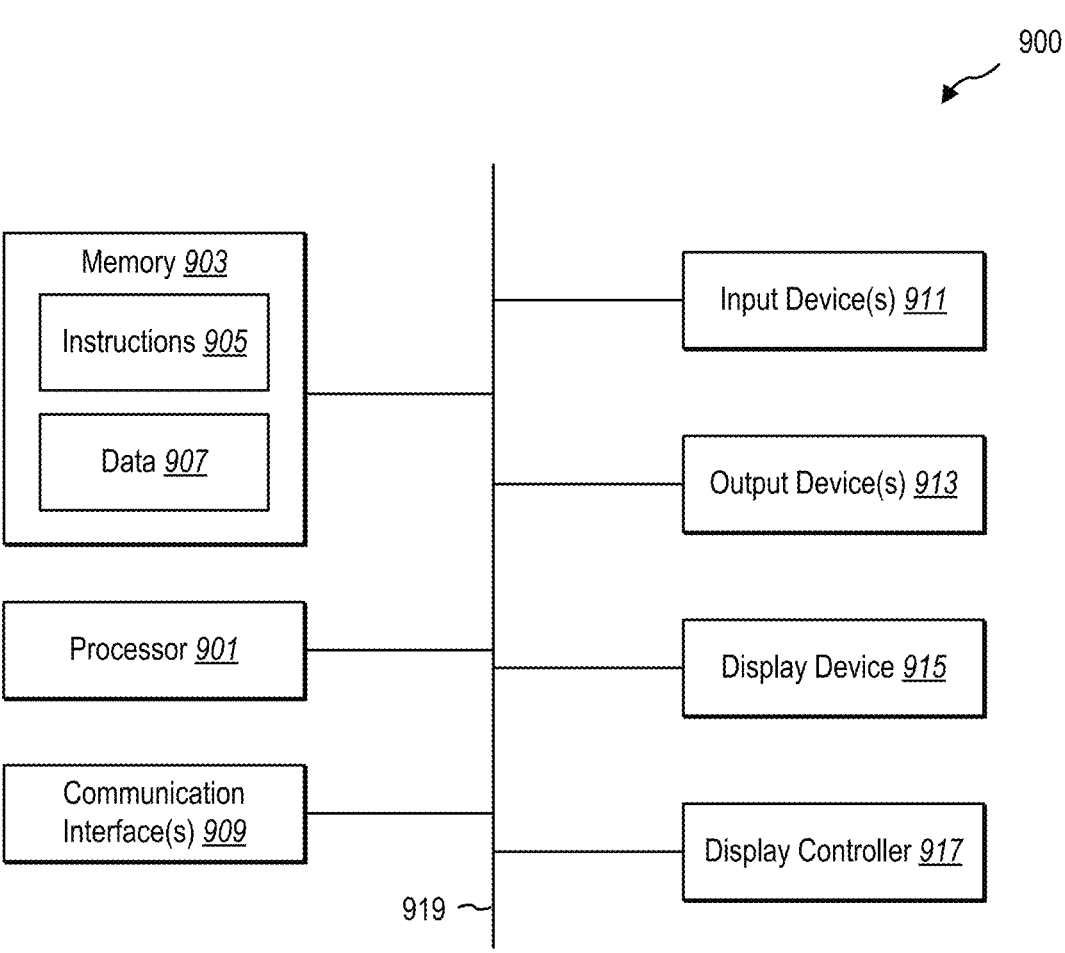
FIG. 9 illustrates example components included within a computer system used to implement the generative document system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer. Combinations of the above are also included within the scope of computer-readable media.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for generating one or more search results documents using one or more artificial intelligence (AI) models, comprising:

in response to receiving a search query, obtaining search link results, including website links and grounding information corresponding to the website links, from a search system;

generating multiple generative search results document prompts to provide to multiple generative AI models for generating multiple generative search results documents concurrently from the search query and the search link results;

selecting a selected generative search results document from the multiple generative search results documents utilizing a generative search results document arbitration model; and providing the selected generative search results document in response to the search query.

2. The computer-implemented method of claim 1, wherein the generative search results document arbitration model includes a lightweight machine learning model trained to determine a presentation quality score for generative search results documents based on corresponding search queries.

3. The computer-implemented method of claim 2, wherein selecting the selected generative search results document from the multiple generative search results documents includes:

generating a first presentation quality score for a comprehensive summary generative search results document using the generative search results document arbitration model based on the search query;

generating a second presentation quality score for a visual digest generative search results document using the generative search results document arbitration model based on the search query;

selecting the comprehensive summary generative search results document as the selected generative search results document when the first presentation quality score is more favorable than the second presentation quality score; and selecting the visual digest generative search results document as the selected generative search results document when the second presentation quality score is more favorable than the first presentation quality score.

4. The computer-implemented method of claim 3, further comprising removing a generative search results document of the multiple generative search results documents from selection consideration based on determining that the generative search results document has a presentation quality score that does not meet a presentation quality threshold.

5. The computer-implemented method of claim 1, wherein the generative search results document arbitration model includes a generative AI model generated to determine a presentation quality score for generative search results documents based on corresponding search queries.

6. The computer-implemented method of claim 1, wherein:

the generative search results document arbitration model includes a set of heuristics for selecting the selected generative search results document; and the set of heuristics includes a ranking of generative search results documents according to available generative search results documents.

7. The computer-implemented method of claim 1, further comprising determining that a cached generated document corresponding to the search query and the search link results is not available, wherein cached generative search results documents include previously generative search results documents for search queries previously generated by a generative AI model to populate curated content formatted in a visually enhanced layout.

8. The computer-implemented method of claim 7, further comprising determining that an additional cached generated document for an additional search query is available by:

querying a generative search results document store with the additional search query and additional search link results corresponding to the additional search query;

determining a correlation score between the additional search query and the additional search link results with a set of stored generative search results documents; and selecting a cached generative search results document from the set of stored generative search results documents based on the cached generative search results document having a highest correlation score that also satisfies a correlation threshold.

9. The computer-implemented method of claim 1, wherein:

a first generative AI model of the multiple generative AI models generates a comprehensive summary generative search results document;

a second generative AI model of the multiple generative AI models generates a visual digest generative search results document; and a third generative AI model of the multiple generative AI models generates a direct answer generative search results document, wherein the multiple generative search results documents differ from each other.

10. The computer-implemented method of claim 1, further comprising storing the selected generative search results document in a generative search results document store with the search query and the search link results.

11. The computer-implemented method of claim 1, further comprising:

obtaining additional search link results in response to receiving an additional search query;

generating multiple additional generative search results document prompts to provide to the multiple generative AI models for generating multiple additional generative search results documents from the additional search query and the additional search link results;

based on determining, by the generative search results document arbitration model, that the multiple additional generative search results documents do not meet a presentation quality threshold, generating a visually-based search results document from the search link results; and providing the visually-based search results document in response to the additional search query.

12. The computer-implemented method of claim 1, further comprising:

obtaining additional search link results in response to receiving an additional search query;

determining that an additional cached generated document corresponding to the additional search query and the additional search link results is available; and providing the additional cached generated document in response to the search query without generating multiple additional generated documents using the multiple generative AI models.

13. A system comprising:

a processing system; and a computer memory comprising instructions that, when executed by the processing system, cause the system to perform operations of:

in response to receiving a search query, obtaining search link results, including website links and grounding information corresponding to the website links, from a search system;

generating multiple generative search results documents by:

generating a first generative search results document prompt to provide to a first generative AI model for generating a comprehensive summary generative search results document from the search query and the search link results;

generating a second generative search results document prompt to provide to a second generative AI model for generating a visual digest generative search results document from the search query and the search link results; and generating a third generative search results document prompt to provide to a third generative AI model for generating a direct answer generative search results document from the search query and the search link results, wherein the first generative search results document prompt, the second generative search results document prompt, and the third generative search results document prompt are provided concurrently;

selecting a selected generative search results document from the multiple generative search results documents utilizing a generative search results document arbitration model; and providing the selected generative search results document in response to the search query.

14. The system of claim 13, wherein the selected generative search results document includes:

a set of suggested follow-up search queries corresponding to content included in the selected generative search results document; and a follow-up search query field for receiving a follow-up search query corresponding to the selected generative search results document.

15. The system of claim 13, further comprising:

storing the search query and context information corresponding to the selected generative search results document;

receiving a follow-up search query from the selected generative search results document;

generating multiple additional generative search results document prompts to provide to multiple generative AI models for generating multiple additional generative search results documents concurrently from the follow-up search query and additional search link results, wherein the multiple additional generative search results document prompts also include the search query and the context information corresponding to the selected generative search results document from a previous search query request;

selecting an additional selected generative search results document from the multiple additional generative search results documents utilizing the generative search results document arbitration model; and providing the additional selected generative search results document in response to the follow-up search query.

16. The system of claim 15, wherein the context information includes information corresponding to the search query, the search link results, the website links, the grounding information, and content of the selected generative search results document.

17. The system of claim 15, wherein providing the additional selected generative search results document includes appending the additional selected generative search results document to the selected generative search results document from the previous search query request.

18. The system of claim 16, wherein the additional selected generative search results document is a different generative search results document type from the selected generative search results document.

19. A computer-implemented method for generating one or more search results documents using one or more artificial intelligence (AI) models, comprising:

in response to receiving a search query, obtaining search link results, including website links and grounding information corresponding to the website links, from a search system;

determining that a cached generated document corresponding to the search query and the search link results is not available by:

querying a generative search results document store with the search query and the search link results; and receiving a negative response regarding an available matching cached generated document;

based on the cached generated document being unavailable, generating multiple generative search results document prompts to provide to multiple generative AI models for generating multiple generative search results documents concurrently from the search query and the search link results;

selecting a selected generative search results document from the multiple generative search results documents utilizing a generative search results document arbitration model that determines a presentation quality score for each of the multiple generative search results documents; and providing the selected generative search results document in response to the search query.

20. The computer-implemented method of claim 19, further comprising:

receiving the search query from a client device;

determining the search link results using a search index; and providing the selected generative search results document within a webpage to the client device in response to the search query.

* * * * *